United States Patent [19]

Fujimoto

[11] Patent Number: 4,716,347
[45] Date of Patent: Dec. 29, 1987

[54] OSCILLATION REDUCING APPARATUS FOR ROTARY COMPRESSOR

[75] Inventor: Satoru Fujimoto, Sakai, Japan

[73] Assignee: Daikin Industries, Ltd., Osaka, Japan

[21] Appl. No.: 839,735

[22] Filed: Mar. 14, 1986

[30] Foreign Application Priority Data

Mar. 15, 1985 [JP] Japan .................................. 60-52947

[51] Int. Cl.⁴ .............................................. G05B 5/01
[52] U.S. Cl. ..................................... 318/460; 318/432; 318/651
[58] Field of Search ............... 318/432, 433, 434, 801, 318/460, 651

[56] References Cited

U.S. PATENT DOCUMENTS

| | | | |
|---|---|---|---|
| 3,809,488 | 5/1974 | Sonderegger | 318/460 X |
| 4,491,775 | 1/1985 | Harvey et al. | 318/434 |
| 4,556,830 | 12/1985 | Schwalm et al. | 318/434 X |
| 4,574,226 | 3/1986 | Binder | 318/434 |
| 4,626,754 | 12/1986 | Habermann | 318/661 X |
| 4,633,982 | 1/1987 | Swigert | 318/640 |

FOREIGN PATENT DOCUMENTS

0013293 1/1982 Japan .................................. 318/460

Primary Examiner—Benjamin Dobeck
Attorney, Agent, or Firm—Birch, Stewart, Kolasch & Birch

[57] ABSTRACT

In a rotary compressor provided with a motor to be controlled by an inverter, the power-supply frequency or impressed voltage during one rotation of the induction motor is varied in accordance with the changes in the load torque to make the production torque of the induction motor correspond to the changes in the load torque so as to fundamentally and effectively reduce the oscillations which are caused by the load torque changes.

9 Claims, 15 Drawing Figures

OSCILLATION REDUCING APPARATUS FOR ROTARY COMPRESSOR

BACKGROUND OF THE INVENTION

The present invention relates to a compressor to be driven by a motor, and, more particularly, to a compressor provided with a vibration reducing device which can reduce the vibration caused by the load torque fluctuation of the compressor.

Generally, in a rotary compressor, the motion balance is almost completely governed to remove the usual vibrations caused by the load torque fluctuations. Namely, the rotary portion of the rotary compressor is varied in rotation by the variations in load torque so that the twisting oscillations are caused in the compressor by the reaction force of the rotation variation. Accordingly, once the type of rotary compressor and load torque variation pattern for the compressor are determined, twist oscillations which may be almost constant are formulated to be caused in accordance with the determination.

Conventionally, as a measure for reducing the oscillations which are caused by such load torque changes, a dynamic oscillation absorber is additionally provided on the compressor container as disclosed in, for example, Japanese Patent Publication (unexamined) Tokkaisho No. 59-50244. The primary natural oscillation number of the dynamic oscillation absorber is made almost consistent with the rotation frequency or power supply frequency of the compressor to absorb the oscillations which are caused by the load torque changes. Also, it is known that the inertia movement of the rotation portion of the rotary compressor is made larger to render the rotary change of the rotation portion smaller, thereby reducing the oscillations which are caused by the load torque changes.

However, any one of the conventional art devices are not effective measures with respect to the oscillations which are caused by the load torque changes, because they are restrictive in their oscillation reduction, and therefore ineffective for oscillation reduction.

In order to check the oscillations caused by the load torque changes, the present inventor investigates the movement of the rotation portion of the rotary compressor. The movement with respect to the amplitude of a twisting vibration of the compressor in a direction of the rotary shaft thereof will be described by the following equation.

$$Is \cdot (d^2\theta s/dt^2) + Ks \cdot \theta s = T_M - T_L \qquad (i)$$

wherein
Is: inertia movement in a direction of the rotary shaft except for the rotation portion of the compressor
$\theta s$: rotary angle with respect to the amplitude of twisting vibration in a direction of the rotary shaft of the compressor
Ks: spring constant of the support portion for the compressor in a direction of the rotary shaft
$T_M$: production torque of the motor
$T_L$: load torque of the compressor In equation (i), to render the rotation changes of the rotation portion smaller through the smaller value of the right side with the change of the load torque $T_L$ of the compressor as the assumption, it is required to change the motor production torque $T_M$ in accordance with the changes in the load torque $T_L$.

Also, the movement with respect to the rotation fluctuation of the rotation portion of the compressor including the rotor of motor and the crank shaft and rotor of compressor will be described by the following equation.

$$Ir(d\omega r/dt) = T_M - T_L \qquad (ii)$$

wherein
Ir: inertia movement of the rotation portion in the direction of the rotary shaft,
$\omega r$: angular velocity of the rotational portion of the compressor In equation (ii), it is clearly understood that the rotational fluctuation of the rotation portion of the compressor is caused by the difference between the generating torque $T_M$ of the motor and the load torque $T_L$ of the compressor.

However, for instance, as the sliding operation is performed between the electric rotation angle and mechanical rotation angle in the case of the induction motor, it is difficult to control the timing to change the motor production torque $T_M$ as the power supply in accordance with the changes in the load torque $T_L$, but it is possible to control the motor production torque $T_M$ if the power supply frequency is controlled minutely during one rotation by attaching some means to detect the mechanical rotation angle. Furthermore, in the case of the rotary compressor provided with the DC motor of the brushless type to be controlled by the inverter, the rotating position of the induction motor is almost located by the position detector so that it is possible to synchronize the changes in the motor production torque $T_M$ with the changes in the load torque $T_L$.

SUMMARY OF THE INVENTION

Accordingly, an object of the present invention is, in a rotary compressor provided with a motor to be controlled by an inverter, to vary the power supply frequency or impressed voltage during one rotation of the motor in accordance with the changes in the load torque to make the production torque of the motor correspond to the changes in the load torque so as to fundamentally and effectively reduce the oscillations which are caused by the load torque changes.

In accomplishing these and other objects, the solving means of the present invention is provided with an inverter for varying the power supply frequency and the impressed voltage of the induction motor of the rotary compressor, a load torque estimating means for estimating the load torque during one rotation of the rotary compressor, a controlling means for receiving the output of the load torque estimating means and controlling the inverter so that the power supply frequency and impressed voltage of the induction motor are variably controlled in accordance with the load torque during one rotation.

Through the above-described construction, in the present invention, the power supply or impressed voltage of the motor is varied by the inverter in accordance with the load torque during one rotation to vary the production torque of the motor so that the variation in the load torque corresponds with the variation in the motor production torque so as to control the rotation variation of the rotary portion.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 5 and 6, (a) and (b), are graphs showing electric signals of outputs derived from components in the circuit of FIG. 3, respectively;

FIGS. 7 and 8, (a) and (b), are graphs showing waveforms of signals relating to the operation of the compressor of FIG. 1, respectively;

FIGS. 10, (a) and (b), is a graph showing electric signals of outputs derived from components in the circuit of FIG. 9.

DETAILED DESCRIPTION OF THE INVENTION

Before the description of the present invention proceeds, it is to be noted that like parts are designated by like reference numerals throughout the accompanying drawings.

Figure 1:
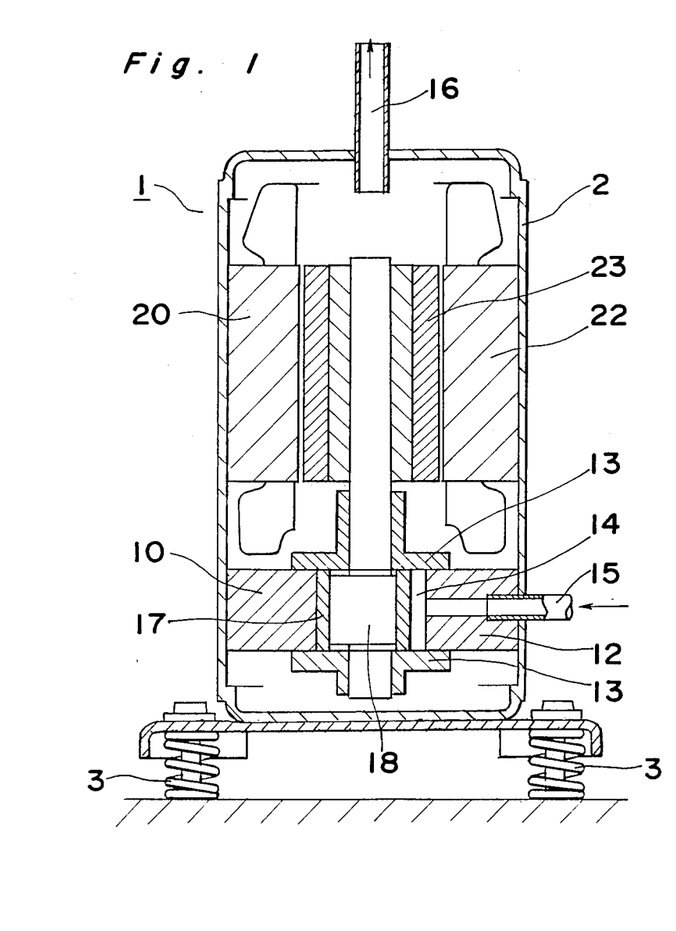
FIG. 1 is a cross-sectional view of a compressor in accordance with one embodiment of the present invention.
Figure 2:
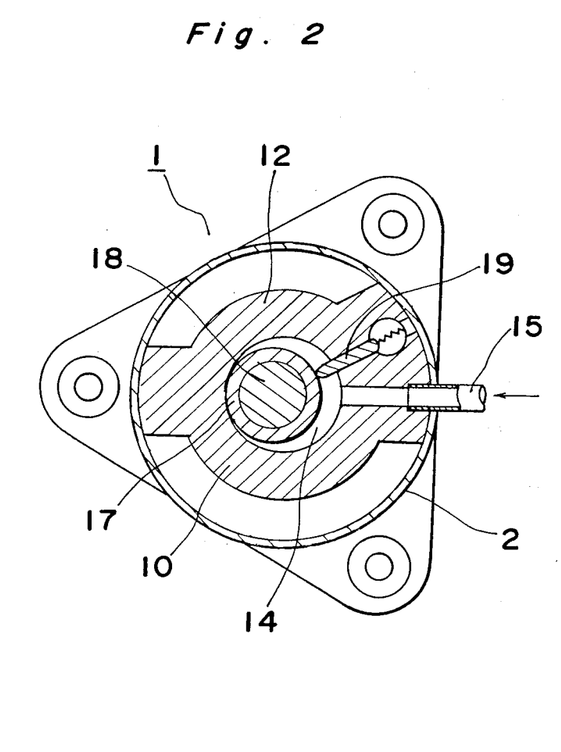
FIG. 2 is a cross-sectional view taken along a line II—II of FIG. 1.
Figure 3:
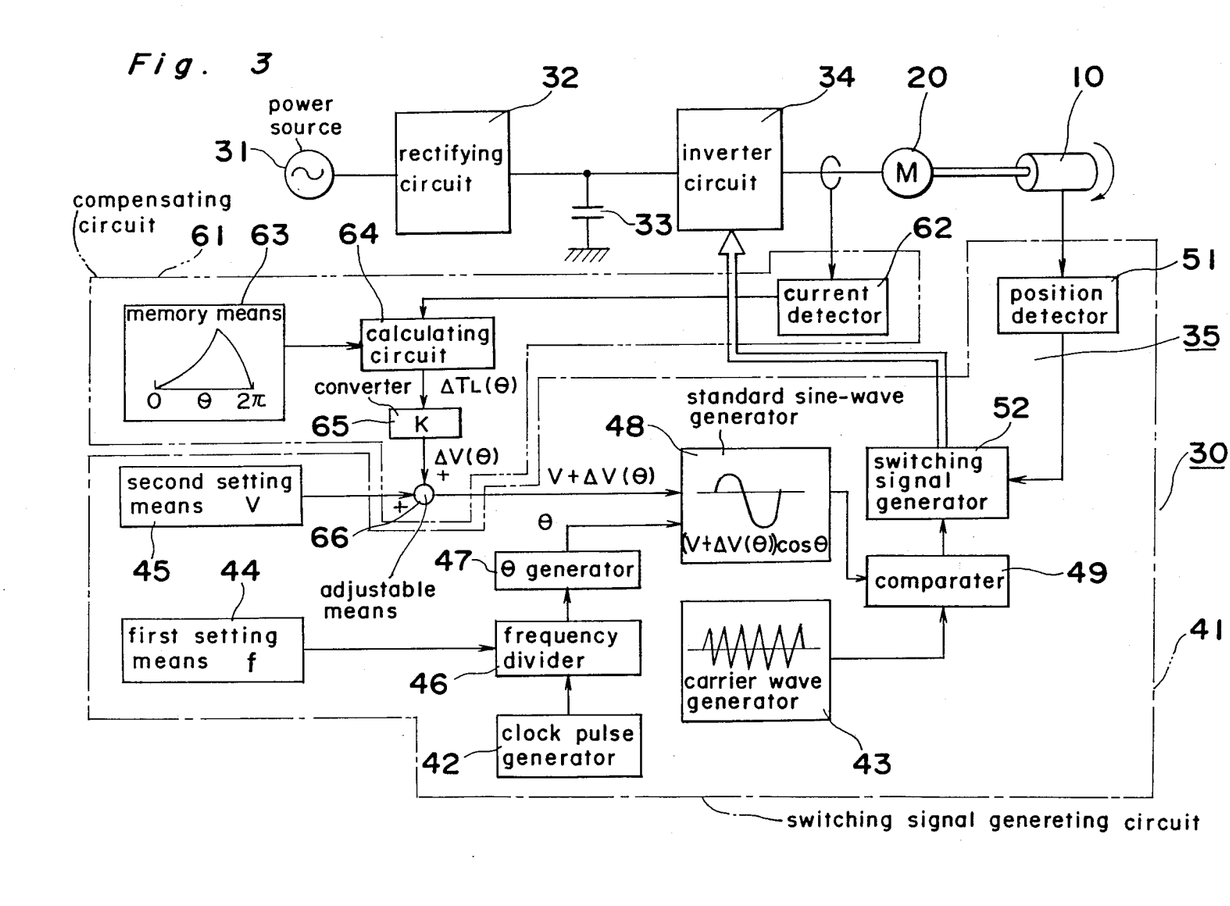
FIG. 3 is a block diagram of an electric circuit constituting a vibration reducing device for use in the compressor of FIG. 1.

One preferred embodiment of the present invention will be described hereinafter with reference to FIGS. 1 to 8, showing a rotary compressor 1 of a two-pole rolling piston type to be installed in a stationary place through a dumping means such as a spring 3. Referring to FIGS. 1 to 3, the rotary compressor 1 comprises a compressor unit 10, a DC motor 20 of a brushless type for driving the compressor unit 10, and a circuit means 30 for controlling the driving condition of the motor 20 on the application of electric power from an AC power source 31 to the motor 20 therethrough. The compressor unit 10 includes a cylinder 12 provided with a pair of cylinder heads 13 covered at the openings of the cylinder 12 at both sides thereof to form a cylinder chamber 14 therein having a suction port 15 and a discharge portion 16, a rotator 17 accommodated within the cylinder chamber 14 to be rotatable eccentrically together with a crank shaft 18 of which both ends are journalled on the cylinder heads 13, and a movable blade 19 for partitioning a space disposed between the cylinder chamber 14 and rotator 16 into two sections, a suction section connected to the suction port 15 and a discharge section connected to the discharge port 16 so as to perform the compression operation for gas which is drawing in at the suction section and taking out from the discharge section. The compressor unit 10 is accommodated fixedly within a casing 2 together with the motor 20. The motor 20 is formed of a synchronous type having a stator 22 of windings provided fixedly within the casing 2, and a rotor 23 made by permanent magnet to be rotatable against the stator 22 together with the crank shaft 18 of the compressor unit 10 under control of the circuit means 30. It is to be noted that the rotator 17 of the compressor unit 10 is driven in synchronous relationship with the rotation of the motor 20, for instance, in such a state that the rotor 23 is connected directly to the crank shaft 18.

Referring to FIG. 3, the circuit means 30 includes the AC power source 31, a rectifying circuit 32, a smoothing circuit 33, an inverter circuit 34 consisting of a transistor commutator for distributing the direct current supplied from the AC power source 31 through the rectifying circuit 32 and smoothing circuit 33 to the respective windings 22 of the motor 20 to drive the compressor unit 10, and a control circuit 35 for controlling the driving condition of the inverter circuit 34. The inverter circuit therefore changes a DC current output from the rectifying circuit 32 into an AC current by means of the control circuit 35, and the synchronous motors 20 is driven by the AC current output from the inverter circuit 34. The control circuit 35 includes a switching signal generating circuit 41 for generating switching signals of a pulse width modulated type, and a compensating circuit 61 for modifying the switching signals according to the load fluctuations of the compressor unit in a manner as described hereinafter.

Figure 5A:
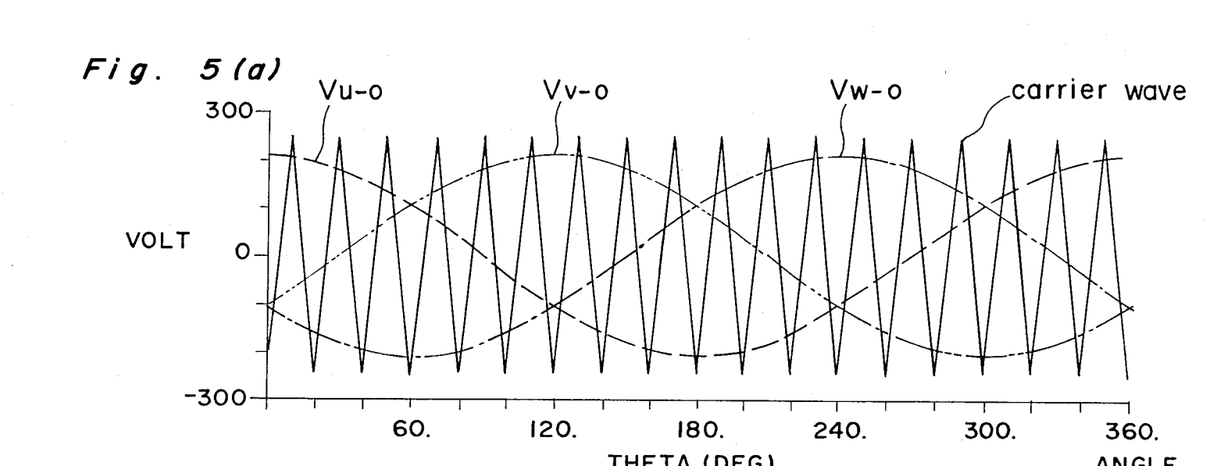
Figure 5B:
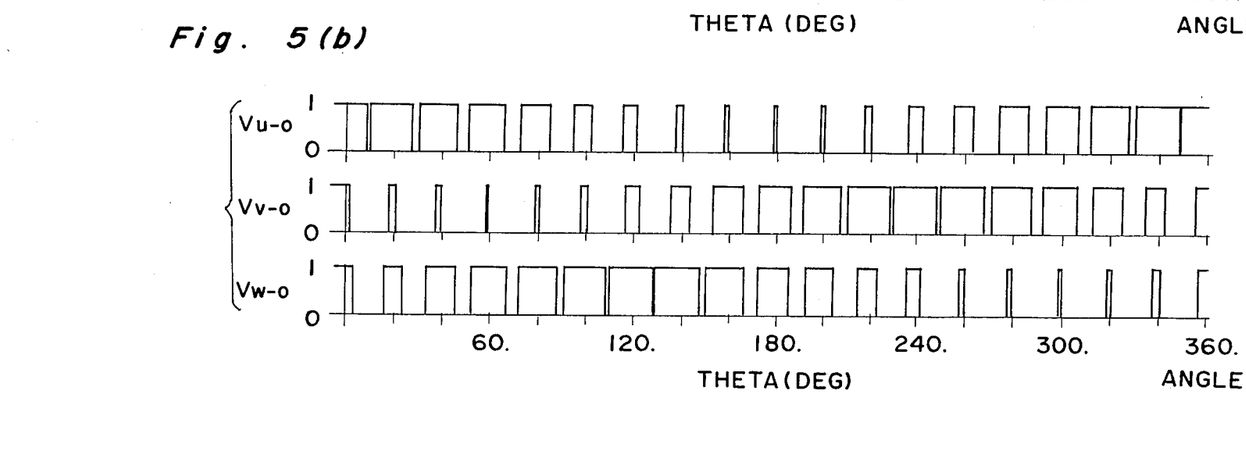
Figure 6A:
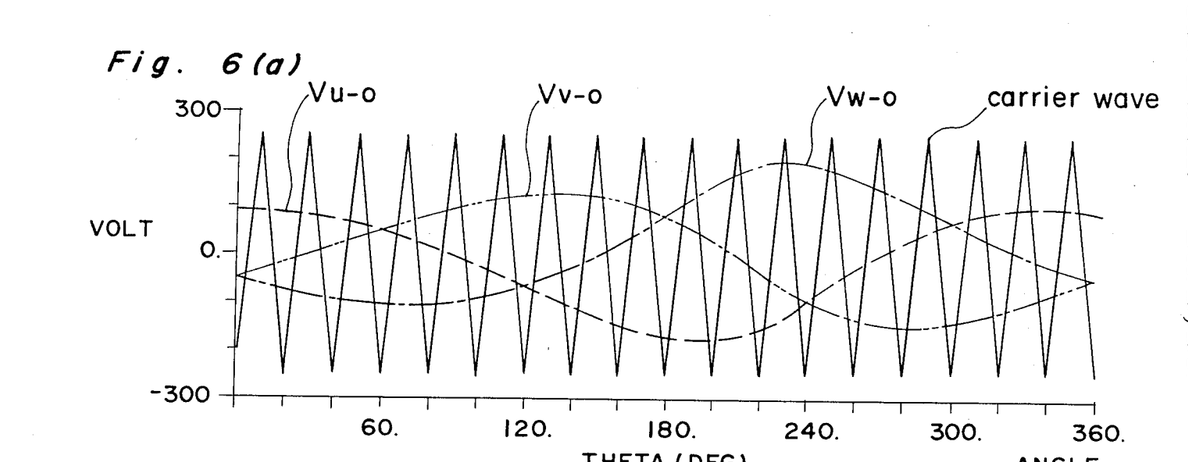
Figure 6B:
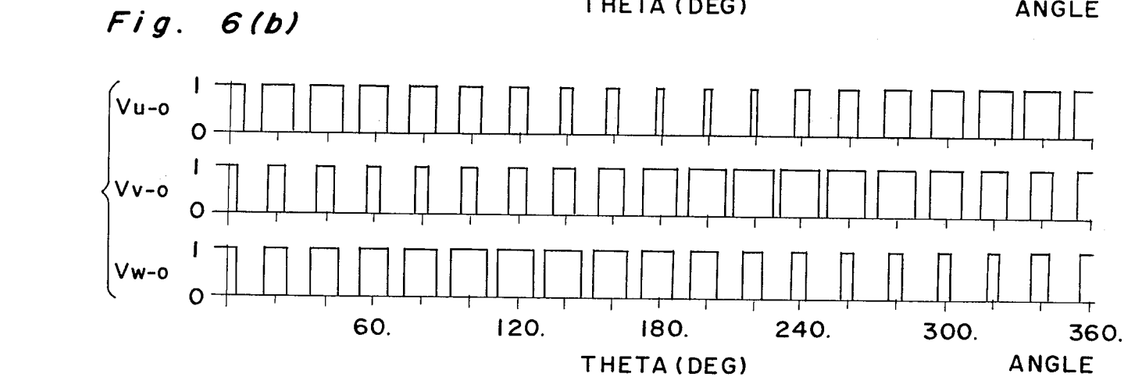

The switching signal generating circuit 41 includes a clock pulse generator 42 for generating clock pulse signals in train, a carrier-wave generator 43 for generating a high frequency current-wave for carrying a wave-signal in succession, as shown in FIG. 5(a), a first setting means 44 for introducing a frequency adjusting signal, a second setting means 45 for introducing a voltage-amplitude adjusting signal, a frequency divider 46 for outputting signals having a frequency lower than that of the frequency adjusting signal of the first setting means 44 on the basis of clock pulse signals, a $\theta$ generator 47 for outputting signals of angles on the basis of signals of the frequency divider, a standard sine-wave generator 48 for outputting a sinusoidal-wave, as shown in FIG. 5(a), on the basis of the angle signals from the $\theta$ generator 47 and voltage-amplitude adjusting signal from the second setting mean 44, a comparator 49 for outputting signals, as shown in FIG. 5(b) in comparison between the high frequency current-wave of the carrier-wave generator 43 and the sinusoidal-wave of the standard sine-wave generator 48, a position detector 51 for detecting a given position of the compressor unit to output a position signal with respect to the angle of the crank shaft 18, and a switching signal generator 52 for outputting switching signals to the inverter circuit 34 upon receiving the comparison signals from the comparator 49 and the position signal from the position detector 51. The first and second setting means 44 and 45 respectively, are adapted to output the respective adjusting signals with respect to frequency and voltage-amplitude corresponding to the difference between an actual value and a standard value relating to the driving condition of the compressor unit 10, for instance, an actual room temperature to be detected for operating the compressor unit 10 and a normal standard room temperature to be set beforehand through experience. The operation of the inverter circuit 34 is controlled by the switching signal generator 52 to drive the motor 20 in accordance with voltage of the AC power source modified by the switching signals of the switching signal generator 52.

Figure 8A:
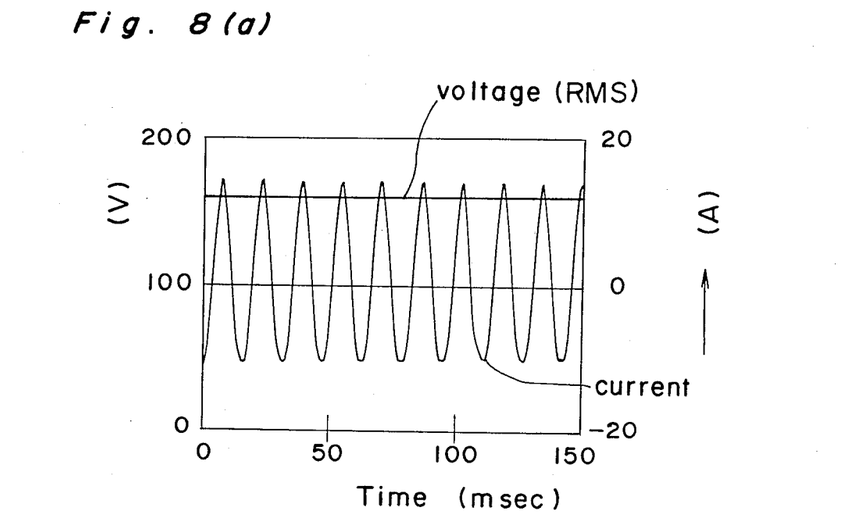

In the case where the $\theta$ generator 47 outputs angle signals $\theta$ relating to the frequency adjusting signal to be inputted from the frequency divider 46, and the second setting means 45 outputs a voltage-amplitude adjusting signal of constant voltage V, the standard sine-wave generator 48 outputs a sinusoidal-wave of V cos $\theta$, and the switching signal generator 52 outputs switching signals corresponding to the sinusoidal-wave of V cos $\theta$ in relation to the crank angle as shown with graphs of FIGS. 5(a) and (b), resulting in that the motor 20 is driven by the inverter circuit 34 to generate torques for driving the compressor unit 10 in correspondence with the switching signals of the switching signal generator 52, thereby producing a large value difference in comparison with a load torque necessary for driving the compressor unit 10, as shown with graphs in FIGS. 8(a) and (b). The compensating circuit 61 is provided in association with the switching signal generating circuit 41 in order to reduce the value difference between the generating torque of the motor 20 and the load torque of the compressor unit 10. The compensating circuit 61 includes a current detector 62 for detecting electric current being fed from the inverter 34 to the motor 20, memory means 63 for storing a fundamental portion of the load torque to be preset in accordance with the result of experiments conducted in relation to variations between crank angles of the crank shaft 18 and load torques of the compressor unit 10 under various conditions of the suction pressure and discharge pressure of the compressor unit 10 to be employed within a range of actual usage of the compressor unit 10, a calculating circuit 64 including a microcomputer for outputting, in relation to the crank angles, a compensating wave of load torque to closely resemble the actual load torque of the compressor unit 10 upon the influence of compensating values proportional to the electric current detected by the current detector 62 onto the fundamental pattern of the load torque of the memory means 63, a converter 65 for outputting, in relation to the crank angles, compensating values of voltage under taking the advantages of the compensating wave of load torque from the calculating circuit 64 by means of a gain K which is obtained as a constant value for changing the load torque to the voltage in accordance with the actual condition of driving the compressor unit 10 together with the motor 20, and an adjustable means 66 provided among the second setting means 45, standard sine-wave generator 48 and converter 65 for modifying the voltage-amplitude adjusting signal of the second setting by means of the compensating values of voltage of the converter 64 to output a compensated voltage-amplitude adjusting signal into the standard sine-wave generator 48.

Figure 4:
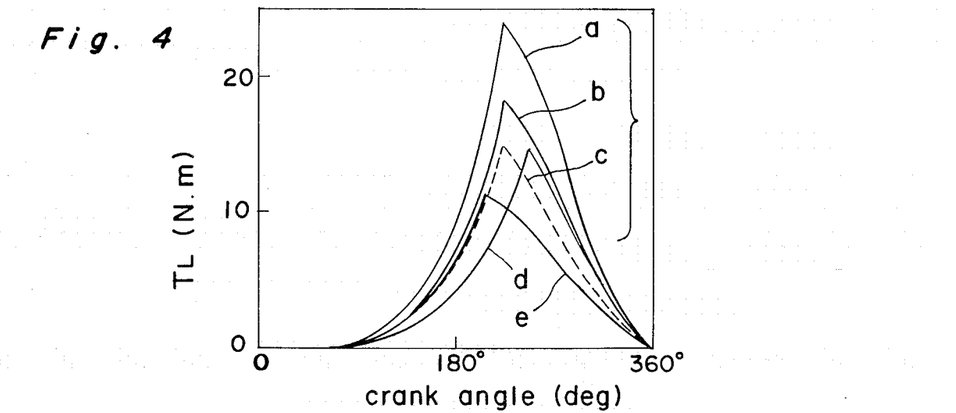
FIG. 4 is a graph showing a fundamental pattern of load torque employed in the circuit of FIG. 3.

As shown with the graph (c) of FIG. 4, the fundamental pattern of load torque to be stored within the memory means 63 is one of the highest frequency in general use of the compressor 1 to be selected from the various patterns, as shown with graphs (a), (b), (d) and (e) of FIG. 4, of the crank angles and load torque obtained in relation to the various conditions of the suction pressure and discharge pressure of the compensator unit. In fact, the various patterns of load torque obtained by experiments resemble each other as like figures each depending upon different values of load torque at a certain crank angle, as shown in FIG. 4, so that supposed patterns of load torque closely resembling the respective various patterns can be obtained through the fundamental pattern multiplied by a corresponding function of constant value for adjusting to the respective pattern. In other words, the figure of one fundamental pattern is almost similar to the other patterns and, therefore, a pattern relating to either of a mean value, maximum value or minimum value of load torque may be employed as the fundamental pattern. With the employment of the fundamental pattern, the driving condition of the motor 20 is modified through the control circuit 35 to generate an output torque corresponding to the variation of the load torque of the compressor unit 10.

Figure 7A:
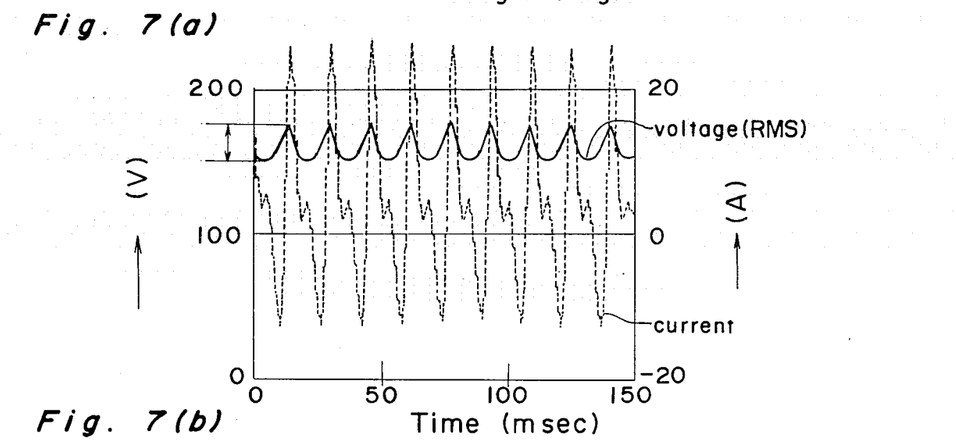

In the arrangement of FIG. 3, the position detector 51 is usually adapted to detect the starting point, i.e., the zero angle of the crank shaft 18 of the compressor unit 10, while the current detector 62 is always applied to detect the electric current being fed from the inverter circuit 34 to the motor 20, as shown with the graph of FIG. 7(a). The output of the position detector 51 is employed as a signal for synchronizing the compressor unit 10 with the operation of the control circuit 35 for the motor 20 depending upon the output of the current detector 62, and the output of the current detector 62 being inputted into the calculating circuit to calculate a mean value of load torque for the compressor unit 10 for a period of each of one rotation of the motor 20. In the control circuit 35, the carrier wave generator 43 outputs a carrier wave as shown with the graph of FIG. 6(a), and the first setting means 44 outputs a sine wave as shown with the graph of FIG. 5(a). Also, the memory means 48 is operated to store a fundamental pattern of load torques in relation to crank angles as shown with graph (c) of FIG. 4, and constant values, such as, for instance, 150 V and 0.18 V/Nm are set within the second setting means 45 and converter 65, respectively. With the above condition, the $\theta$ generator 47, calculating circuit 64, converter 65, and adjustable means 66 respectively output signals of $\theta$, $\Delta T_L(\theta)$, $\Delta V(\theta) = K \cdot \Delta T(\theta)$ and $(V + \Delta V(\theta))$ in a line towards the standard sine-wave generator 48. Then, the standard sine-wave generator 48 outputs a modified sine-wave of $(V + \Delta V(\theta)) \cos \theta$, as shown with graphs Vu-0, Vv-0, Vw-0 of FIG. 6(a), and the comparator 49 generates pulse signals, as shown with graphs of FIG. 6(b). Accordingly, the inverter circuit 34 is controlled by a wave signal of voltage, as shown with a graph of FIG. 7(a), which is regulated by the output signals of the switching signal generator 52. By the output of the inverter circuit 34, the motor 20 is driven to generate torques for driving the compressor unit 10, as shown with a graph TM of FIG. 7(b), while the compressor unit 10 is driven with load torque, as shown with a graph TL of FIG. 7(b).

Figure 7B:
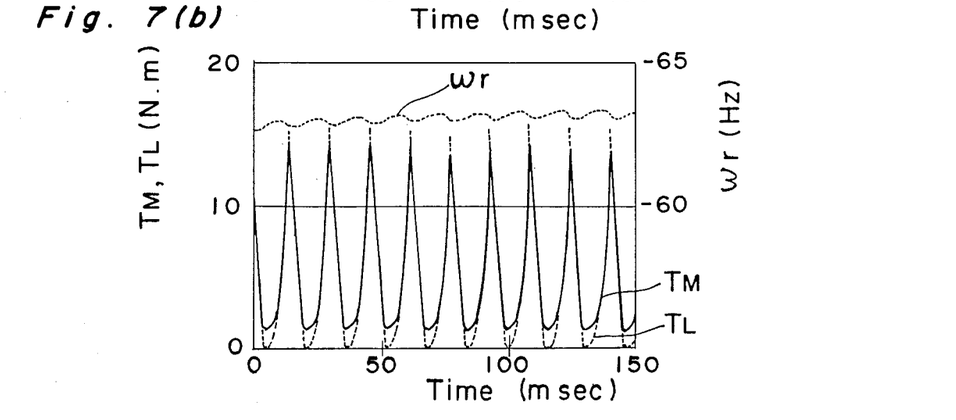
Figure 8B:
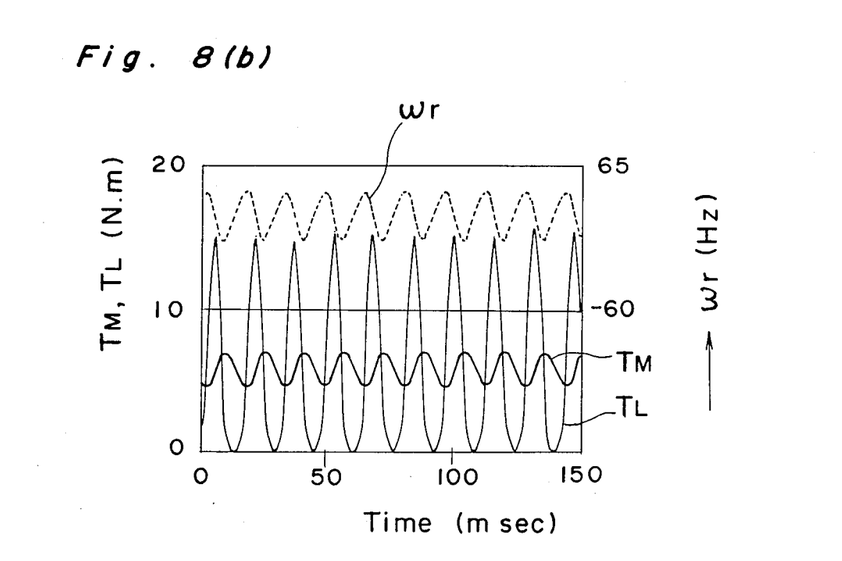

From FIG. 7(b), it is clearly understood that the two graphs are in a close relationship to the other to narrow a gap between the two graphs narrow, and it can be easily obtained as a stable driving condition of the compressor, as shown with a graph of rotational speed thereof in FIG. 7(b). In other words, by providing the vibration reducing device of the present invention as mentioned above, the voltage to be applied to the motor 20 through the inverter circuit is modified by the modified sine-wave generated from the control circuit in order to fluctuate the torque generated from the motor 20 in accordance with the changing of load torque necessary for the compressor unit 10 for each of its one revolution, whereby the generated torque of the motor 20 and the load torque of the compressor unit 10 are too close to each other to suppress the rotational fluctuation of the compressor 1 as well as the twisting vibration thereof. Therefore, the rotational fluctuation and twisting vibration of the compressor can be drastically suppressed by reducing the difference between the generated torque of the motor 20 and the load torque of the compressor unit 10 which is a factor in the exciting force for generating the twisting vibration of the compressor and the rotational fluctuation of the rotary components including the rotator of the compressor unit and rotor of the motor. As one example, FIGS. 7 and 9 respectively show graphs of the voltage V, V+ΔV applied from the inverter circuit 34 to the motor 20, the generating torque of the motor 20, the load torque of the compressor 10, and the rotational speed of the compressor 1. FIG. 7 is related to the device of the present invention providing the compensating circuit. FIG. 8 is related to a device without the compensating circuit. It is to be noted that in comparison with two kinds of graphs, the situation of FIG. 7 is more stable than that of FIG. 8 with respect to the rotational speed of the compressor. In FIG. 8(b), the load torque $T_L$ necessary for compression of the compressor is shown with a curve of $T_L$ having a large fluctuation of between 0 to 16 Nm for one revolution of the compressor and the generating torque of the motor is shown with a curve $T_M$ having almost a constant value without any fluctuation, resulting in that the rotational fluctuation of the rotation speed with respect to the rotational components is generated, as shown with a curve of ωr, to be caused by the difference between the curves $T_L$ and $T_M$ with the amount of amplitude of 1.8 Hz in addition to the generation of the twisting vibration of the compressor. However, in FIG. 7(b), by controlling the compensating circuit, the generating torque $T_M$ of the motor is modified to fluctuate the approach toward the curve of the load torque $T_L$ in synchronization with the driving condition of the compressor, whereby the rotational fluctuation of the rotational speed ωr is suppressed under the influence of a narrow gap between the curves $T_L$ and $T_M$ with the amount of amplitude of 0.32 Hz, which is about one-fifth less in comparison with that of FIG. 8(b). Accordingly, it is clear that by the employment of the compensating circuit of the present invention, the rotational fluctuation and twisting vibration of the compressor are reduced to a great extent to drive the compressor in a stable condition.

The above embodiment of the present invention is described with respect to the vibration reducing device for use in a rotary compressor by providing a compensating circuit which generates a voltage-amplitude adjusting signal for modifying the applied voltage to the motor, but it can, also, be done to obtain the same result by the employment of the other compensating circuits of types relating to frequency modulation, phase modulation, and the combination of amplitude modulation, frequency modulation and phase modulation. To provide a compensating circuit in combination with amplitude modulation and frequency modulation, another converter 71 and adjustable means 72 are added into the control circuit 35 of the embodiment of FIG. 3.

Figure 10A:
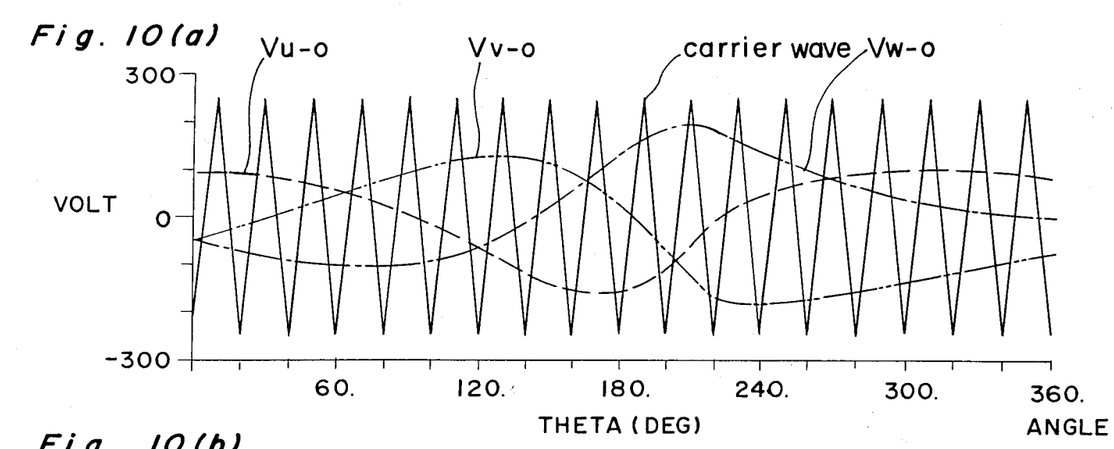
Figure 10B:
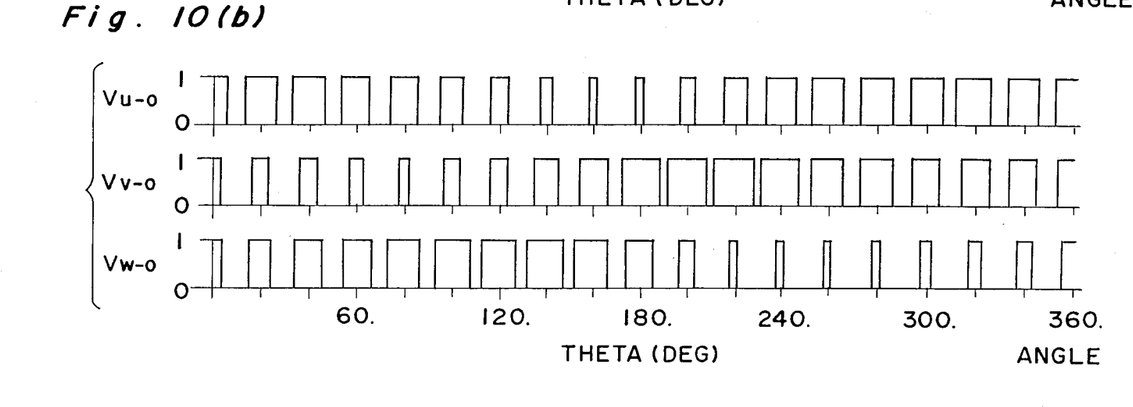

The adjustable means 72 is provided between the θ generator 47 and standard sine-wave generator 48, and the converter 71 is provided between the calculating circuit 64 and the adjustable means 72, the output θ of the θ generator 47 being adapted to modify by the output $\Delta T_L(\theta)$ of the calculating circuit 64 through the converter 71 which converts the output of the calculating circuit 64 to the frequency $\Delta\omega(\theta)$ by means of another gain $K_2$. The gain $K_2$ is obtained as a constant value for changing the load torque to a frequency in accordance with the actual driving condition of the compressor. Upon receiving the output $(\theta+\Delta\omega(\theta)t)$ from the adjustable means 72 in addition to the output $(V+\Delta V(\theta))$ of the adjustable means 66, the standard sine-wave generator 48 outputs another modified sine-wave $[(V+\Delta V(\theta))\cdot\cos(\theta+\Delta\omega(\theta)t)]$ as shown with graphs of FIG. 10(a), and the comparator 49 generates pulse signals, as shown with graphs of FIG. 10(b). Accordingly, the inverter circuit 34 is controlled by a wave signal of voltage regulated in combination of amplitude modulation and frequency modulation, resulting in that the applied voltage to the motor is adjusted to follow the changing amplitude and frequency with respect to the driving condition of the compressor so as to make it close to the load torque of the compressor unit.

As is clear from the foregoing description, according to the fluctuation reducing apparatus of the rotary compressor of the present invention, the generating torque of the motor may be varied in accordance with the fluctuation of the load torque to control the rotation variation of the rotation portion of the compressor. Thus, even in the rotary compressor which has a large load torque change, the fluctuation which is caused by the load torque change may be fundamentally and effectively reduced.

Figure 9:
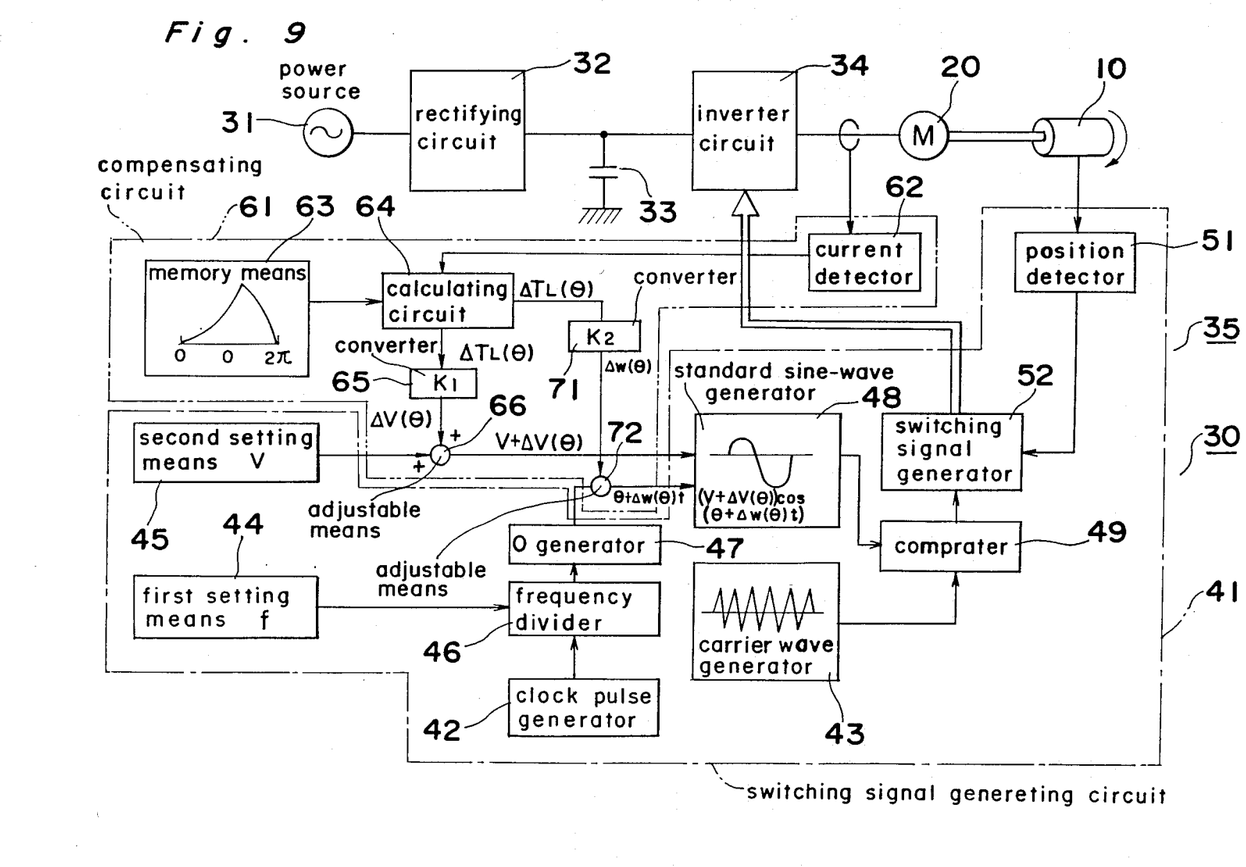
FIG. 9 is a view similar to FIG. 3, providing additional components to the circuit of FIG. 3.

Although the present invention has been fully described by way of examples with reference to the accompanying drawings, it is to be noted that various changes and modifications will be apparent to those skilled in the art. For instance, the examples are directed to a rotary compressor of a two-pole rolling piston type, but the present invention can be applied to various kinds of compressors, such as one of the reciprocating piston type, which induce the problems of rotational fluctuation and vibration to be caused depending upon the torque fluctuation and twisting vibration thereof. Also, with the same arrangement of the control circuit as shown in FIG. 9, an AC induction motor can be employed as a driving means for the compressor unit in place of the DC motor of FIG. 3 to obtain a stable driving condition without any trouble of rotational fluctuation and vibration of the compressor. Further, in the control circuit, the position detector is adapted to synchronize rotational angles between the mechanical components and electrical circuits, and can be formed as various types such as the employment of hole element, high frequency vibrator, counter electromotive force relay and the like. Therefore, unless otherwise such changes and modifications depart from the scope of the present invention, they should be construed as included therein.

What is claimed is:

1. A vibration reducing device for a rotary compressor to be driven by a motor, comprising:
    an inverter for actuating the motor upon receiving an electric power from a power source;
    means for synchronizing the actuation of the inverter with the rotation of the compressor;
    means for detecting the driving condition of the motor;
    means for controlling the output of the inverter in response to the output of the means for detecting; and
    means for adjusting the output of the means for controlling on the basis of a factor relating to a load torque of the compressor, thereby controlling the generating torque of the motor in accordance with the load torque fluctuation of the compressor.

2. The device as defined in claim 1, wherein the motor is a synchronous motor with a permanent magnetic motor.

3. The device as defined in claim 1, wherein the motor is an AC induction motor.

4. The device as defined in claim 1, wherein the means for synchronizing includes a detector for detecting the position of the rotary shaft of the compressor.

5. The device as defined in claim 1, wherein the means for detecting includes a detector for detecting electric current being fed from the inverter to the motor.

6. The device as defined in claim 1, wherein the factor of the means for adjusting is represented by voltage amplitudes relating to a load torque of the compressor.

7. The device as defined in claim 1, wherein the factor of the means for adjusting is represented by frequencies relating to a load torque of the compressor.

8. The device as defined in claim 1, wherein the factor of the means for adjusting is represented by phases relating to a load torque of compressor.

9. The device as defined in claim 1, wherein the means for adjusting includes a memory for storing a predetermined pattern of factors relating to the load torque of the compressor.

* * * * *